United States Patent
Doan et al.

(10) Patent No.: US 12,172,773 B2
(45) Date of Patent: Dec. 24, 2024

(54) CONTINUOUS AIRPLANE VERIFICATION TO IMPROVE PRODUCTION BUILD EFFICIENCY

(71) Applicant: The Boeing Company, Chicago, IL (US)

(72) Inventors: Vinh Q. Doan, Lynnwood, WA (US); Tri Minh Phan, Renton, WA (US); Shu Hsin Robin Hsu, Mill Creek, WA (US); Luis Rogelio Gonzalez, Mill Creek, WA (US); Rickie Lee, Mill Creek, WA (US); Homero S. Cerna, Bothell, WA (US)

(73) Assignee: The Boeing Company, Chicago, IL (US)

( * ) Notice: Subject to any disclaimer, the term of this patent is extended or adjusted under 35 U.S.C. 154(b) by 669 days.

(21) Appl. No.: 17/523,097

(22) Filed: Nov. 10, 2021

(65) Prior Publication Data

US 2022/0144455 A1    May 12, 2022

Related U.S. Application Data

(60) Provisional application No. 63/111,804, filed on Nov. 10, 2020.

(51) Int. Cl.
*B64F 5/60* (2017.01)
*B64D 43/00* (2006.01)

(52) U.S. Cl.
CPC .............. *B64F 5/60* (2017.01); *B64D 43/00* (2013.01)

(58) Field of Classification Search
CPC ... B64F 5/60; B64F 5/10; B64D 43/00; B64D 13/06
See application file for complete search history.

(56) References Cited

U.S. PATENT DOCUMENTS 9,052,375 B2 *  6/2015  Sampigethaya .......... G01S 1/30
9,678,488 B1     6/2017  Dhondt et al.
(Continued)

FOREIGN PATENT DOCUMENTS

CN    106043707 B    1/2019
EP    3367195 A1     8/2018
(Continued)

OTHER PUBLICATIONS

European Search Report for EPO Patent Application No. 21193018.5, mailed Feb. 14, 2022, 10 pages.

*Primary Examiner* — Elias Desta
(74) *Attorney, Agent, or Firm* — Jordan IP Law, LLC

(57) ABSTRACT

Systems, apparatuses and methods may provide for a verification system for an aircraft. The verification system includes a verification function subsystem to automatically verify an operational condition of one or more components of an aircraft based on airflow related signals, hydraulic related signals, and electrical signals and associated impedances and present the operational condition via a display. The airflow related signals may be obtained from a plurality of airflow fittings, the hydraulic related signals may be obtained from a plurality of hydraulic fittings, and the electrical signals and associated impedances may be obtained from a plurality of electrical connectors. At least two of the airflow fittings, at least two of the hydraulic fittings, and at least two of the electrical connectors may be positioned in different aircraft sections before additional aircraft sections are assembled.

22 Claims, 11 Drawing Sheets

(56) References Cited

U.S. PATENT DOCUMENTS 11,170,586 B1 * 11/2021 Dixit .................... B64F 5/40
2021/0234767 A1 * 7/2021 Ricci .................... G06F 21/10

FOREIGN PATENT DOCUMENTS

| EP | 3718902 A1 | 10/2020 |
| GB | 2398864 A | 9/2004 |
| WO | 2007057411 A1 | 5/2007 |

* cited by examiner

CONTINUOUS AIRPLANE VERIFICATION TO IMPROVE PRODUCTION BUILD EFFICIENCY

CROSS-REFERENCE TO RELATED APPLICATIONS

This U.S. Non-provisional patent application claims the benefit of priority to U.S. Provisional Patent Application No. 63/111,804 filed Nov. 10, 2020.

TECHNICAL FIELD

Embodiments generally relate to verifying the operational condition of airplane systems. More particularly, embodiments relate to continuous airplane verification to improve production build efficiency.

BACKGROUND

The process of building an airplane typically involves assembling many complex systems that are located in different sections of the airplane. Verifying that the assembled systems are operational may be limited to testing that takes place after the airplane build is nearly or fully complete. As a result, errors and/or faults detected in late stages of the build may be costly and time consuming to correct.

SUMMARY

In accordance with one or more embodiments, a verification system for an aircraft comprises a plurality of airflow fittings, wherein at least two of the airflow fittings are positioned in different aircraft sections that adjoin one another, and wherein each airflow fitting connects airflow conduit segments and includes one or more conduit sensors to generate airflow related signals regarding the airflow conduit segments, a plurality of hydraulic fittings, wherein at least two of the hydraulic fittings are positioned in the different aircraft sections, and wherein each hydraulic fitting connects hydraulic line segments and includes one or more line sensors to generate hydraulic related signals regarding the hydraulic line segments, a plurality of electrical connectors, wherein at least two of the electrical connectors are positioned in and connect wiring in the different aircraft sections, a line replaceable unit to sense electrical signals and associated impedances corresponding to the plurality of electrical connectors, and a verification function subsystem to automatically verify an operational condition of one or more components of an aircraft based on the airflow related signals, the hydraulic related signals, and the electrical signals and associated impedances, and present the operational condition via a display.

In accordance with one or more embodiments, a method of operating a verification system after an aircraft has been assembled comprises obtaining airflow related signals regarding airflow conduit segments from a plurality of airflow fittings, wherein at least two of the airflow fittings are positioned in different aircraft sections that adjoin one another, obtaining hydraulic related signals regarding hydraulic line segments from a plurality of hydraulic fittings, wherein at least two of the hydraulic fittings are positioned in the different aircraft sections, obtaining electrical signals and associated impedances associated with a plurality of electrical connectors, wherein at least two of the electrical connectors are positioned in the different aircraft sections, automatically verifying an operational condition of one or more components of the aircraft based on the airflow related signals, the hydraulic related signals, and the electrical signals and associated impedances, and sending the operational condition to a display associated with the aircraft.

In accordance with one or more embodiments, a method of operating a verification system while an aircraft is being assembled comprises obtaining airflow related signals regarding airflow conduit segments from a plurality of airflow fittings, wherein at least two of the airflow fittings are positioned in different aircraft sections that adjoin one another, obtaining hydraulic related signals regarding hydraulic line segments from a plurality of hydraulic fittings, wherein at least two of the hydraulic fittings are positioned in the different aircraft sections, obtaining electrical signals and associated impedances associated with a plurality of electrical connectors, wherein at least two of the electrical connectors are positioned in the different aircraft sections, automatically verifying an operational condition of one or more components of the aircraft based on the airflow related signals, the hydraulic related signals, and the electrical signals and associated impedances, and presenting the operational condition via a display.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
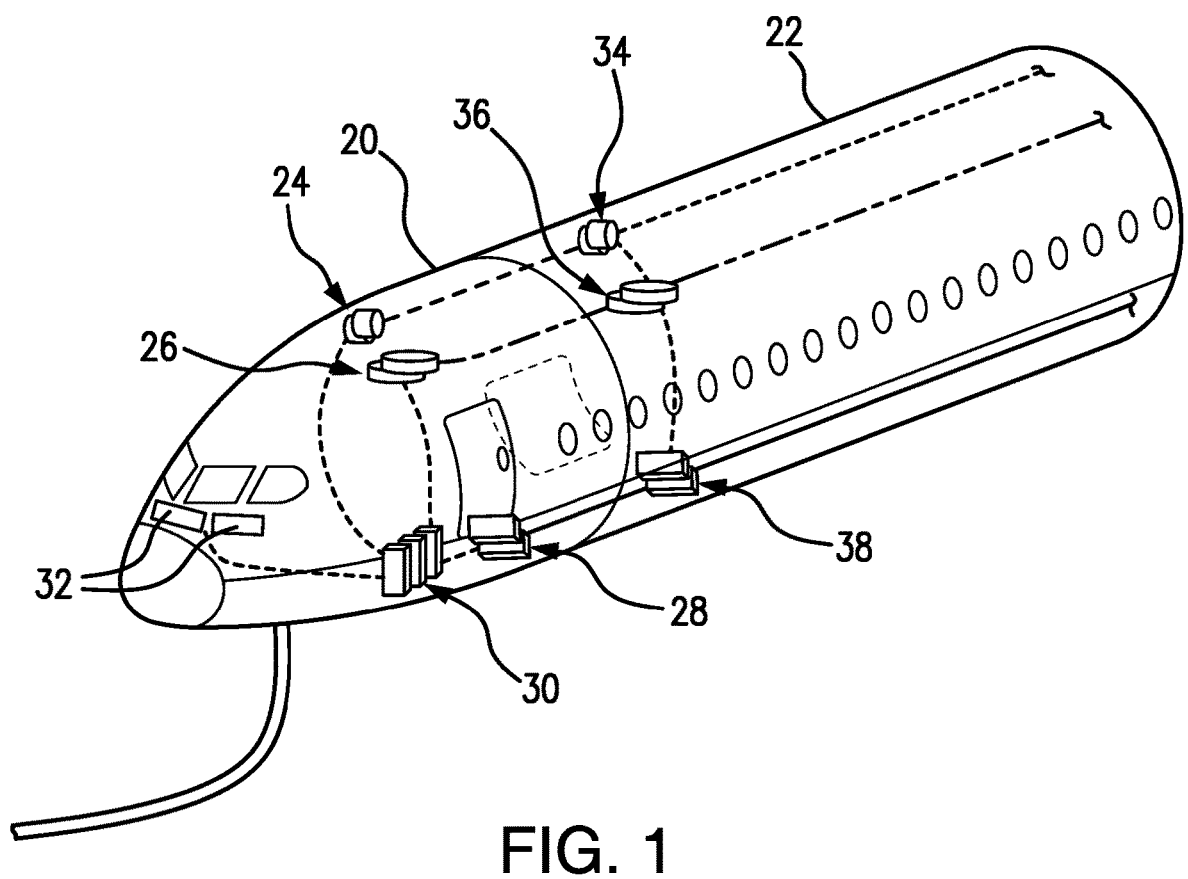
FIG. 1 is a perspective view of an example of different aircraft sections that adjoin one another according to an embodiment.

Turning now to FIG. 1, a partially assembled aircraft is shown. In the illustrated example, a first forward section 20 adjoins (e.g., is connected to) a second forward section 22.

In an embodiment, the first forward section 20 includes a plurality of electrical connectors 24, where the electrical connectors 24 connect wiring in the first forward section 20. The first forward section 20 may also include a plurality of airflow fittings 26 that connect airflow conduit segments in the first forward section 20. Additionally, the illustrated first forward section 20 includes a plurality of hydraulic fittings 28 that connect hydraulic line segments on the first forward section 20. Similarly, the second forward section 22 may include a plurality of electrical connectors 34 that connect wiring in the second forward section 22, a plurality of airflow fittings 36 that connect airflow conduit segments in the second forward section 22, and a plurality of hydraulic fittings 38 that connect hydraulic line segments in the second forward section 22.

In an embodiment, each of the airflow fittings 26, 36 includes one or more conduit sensors to generate airflow related signals (e.g., pressure, air quality and/or temperature signals) regarding the airflow conduit segments. Additionally, each of the hydraulic fittings 28, 38 includes one or more line sensors to generate hydraulic related signals (e.g., pressure, fluid level, contamination control and/or temperature signals) regarding the hydraulic line segments. Moreover, a line replaceable unit (LRU, not shown) senses electrical signals and associated impedances corresponding to the electrical connectors 24, 34. As a will be discussed in greater detail, each of a plurality of avionics systems 30 may include electronic, hydraulic and airflow system head-end LRUs and a verification function subsystem (e.g., continuous airplane verification/CAV function subsystem) that automatically verifies and/or determines the operational condition (e.g., Pass/Fail) of one or more components of the aircraft based on the airflow related signals, the hydraulic related signals, and the electrical signals and associated impedances. Verifying the operational condition while the aircraft is being assembled may save a considerable amount of time and cost. In an embodiment, the verification function subsystem sends and/or presents the operational condition to a display such as, for example, one or more flight deck displays 32, a remote display (not shown), and so forth.

Figure 2:
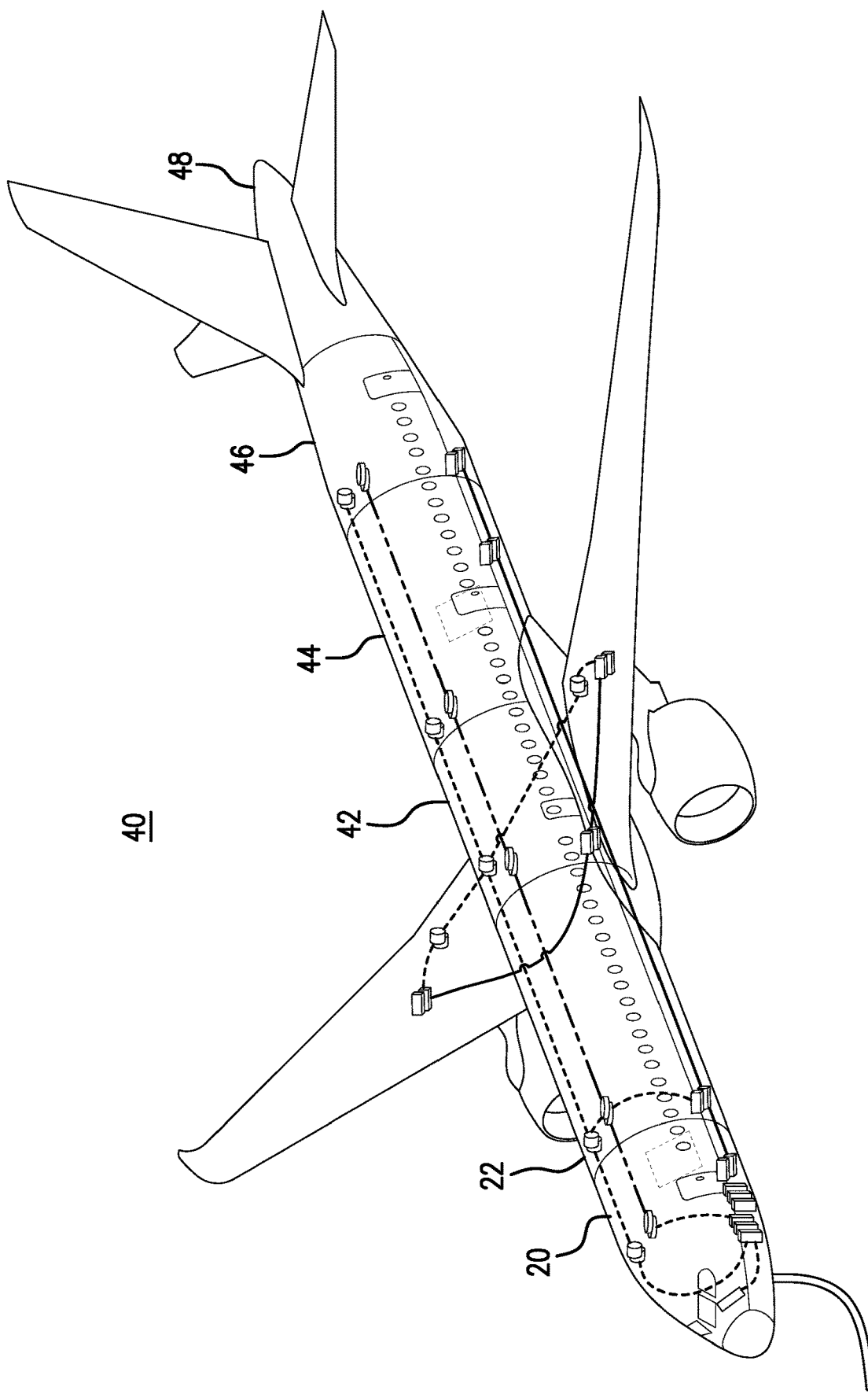
FIG. 2 is a perspective view of an example of an aircraft that has been assembled according to an embodiment.

FIG. 2 shows an aircraft 40 that has been assembled. In the illustrated example, the aircraft 40 includes a mid-body section 42, a first aft section 44, a second aft section 46, and a third aft section 48 in addition to the first forward section 20 and the second forward section 22. In an embodiment, the mid-body section 42, the first aft section 44 and the second aft section 46 also include electrical connectors, airflow fittings and hydraulic fittings with sensors to facilitate the automatic and continuous verification of the operational condition of components in the aircraft 40. Indeed, the verification may also be conducted after the aircraft 40 has been assembled (e.g., in final assembly, the flight line, the delivery center and/or in service).

Figure 3A:
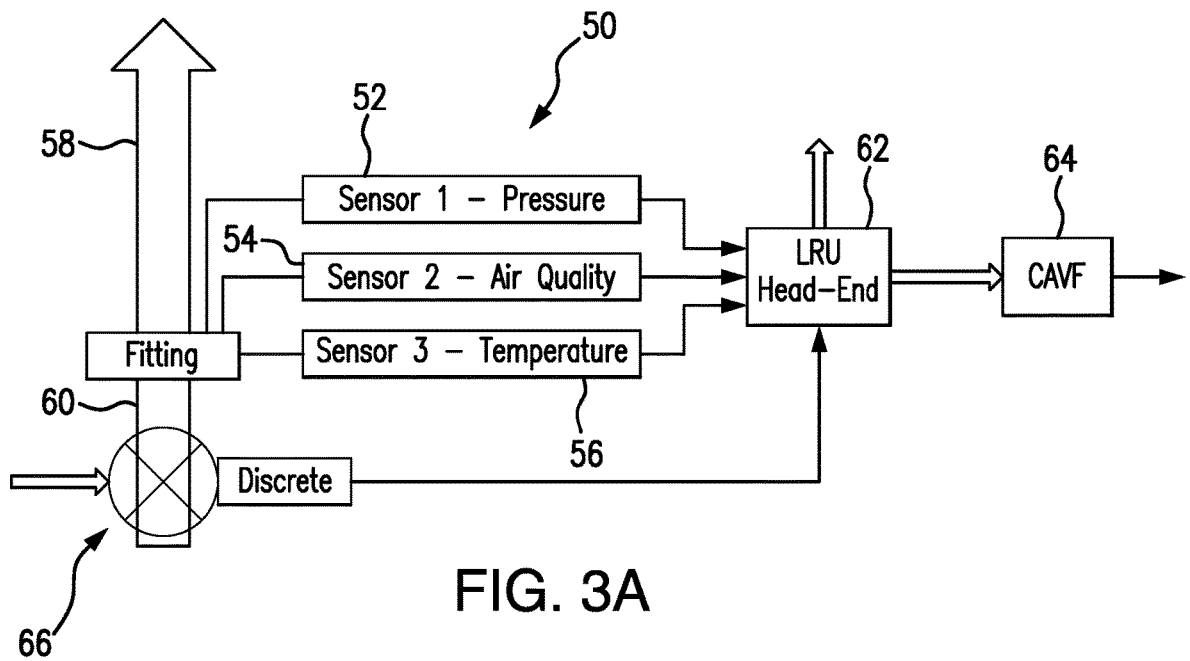
FIG. 3A is a block diagram of an example of an airflow fitting according to an embodiment.
Figure 3B:
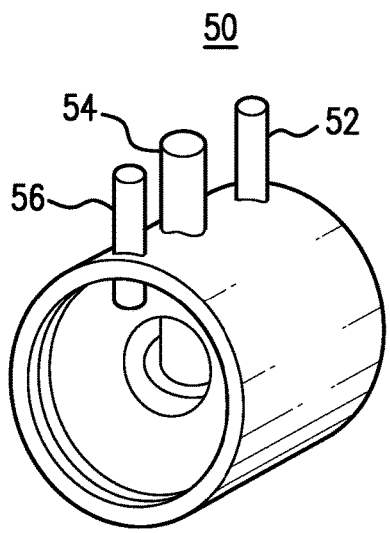
FIG. 3B is a perspective view of an example of the airflow fitting in FIG. 3A.

FIGS. 3A and 3B show an airflow fitting 50, which may be readily substituted for one or more of the airflow fittings 26, 36 (FIG. 1), already discussed. In the illustrated example, the airflow fitting 50 includes a pressure sensor 52, an air quality sensor 54, and a temperature sensor 56. In an embodiment, the airflow fitting 50 connects a first airflow conduit segment 58 to a second airflow conduit segment 60. The airflow fitting 50 may be coupled to an LRU 62 (e.g., head-end), which in turn communicates with a verification function subsystem 64 (e.g., CAF function/CAVF). In one example, the verification function subsystem 64 may be readily substituted for the verification function subsystem of the avionics systems 30 (FIG. 1), already discussed. Additionally, the second airflow conduit segment 60 may be coupled to the LRU 62 via a control valve 66 that receives analog control signals and generates a discrete output representing the state of the control valve 66. In an embodiment, the verification function subsystem 64 automatically determines whether the conduit segments 58, 60 are operational based on the signals from the airflow fitting 50 and the control valve 66.

Figure 4A:
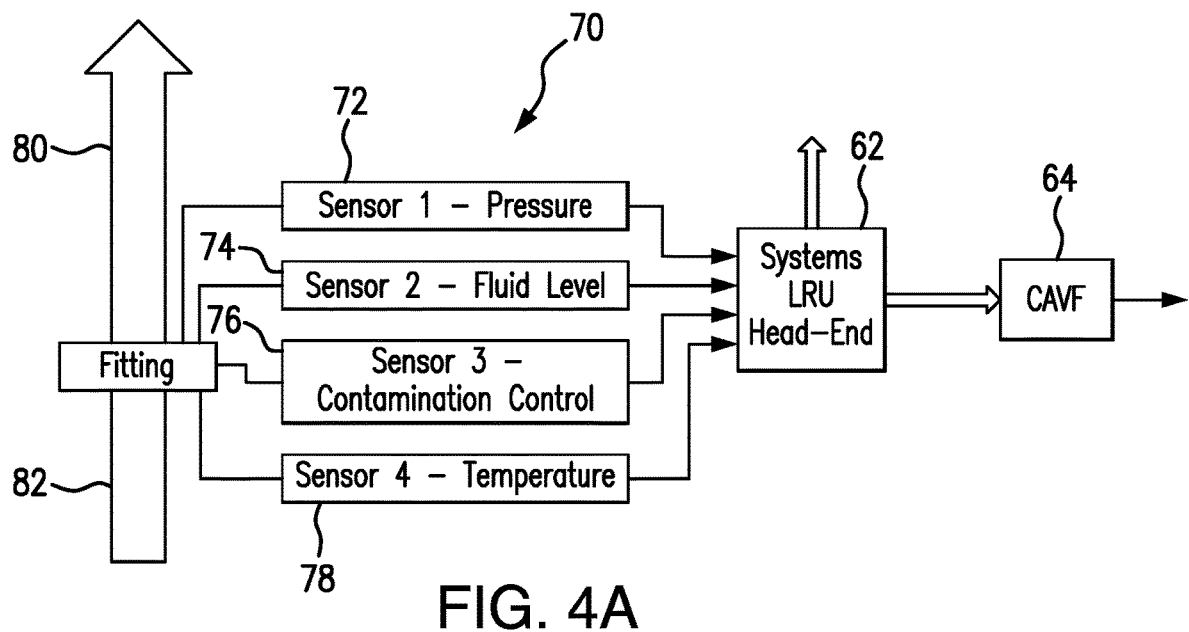
FIG. 4A is a block diagram of an example of a hydraulic fitting according to an embodiment.
Figure 4B:
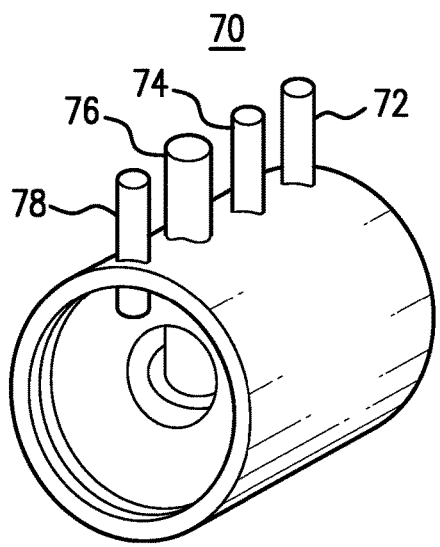
FIG. 4B is a perspective view of an example of the hydraulic fitting in FIG. 4A.

FIGS. 4A and 4B show a hydraulic fitting 70, which may be readily substituted for one or more of the hydraulic fittings 28, 38 (FIG. 1), already discussed. In the illustrated example, the hydraulic fitting 70 includes a pressure sensor 72, a fluid level sensor 74, a contamination control sensor 76, and a temperature sensor 78. In an embodiment, the hydraulic fitting connects a first hydraulic line segment 80 (e.g., tube) to a second hydraulic line segment 82. The hydraulic fitting 70 may be coupled to the LRU 62, which in turn communicates with the verification function subsystem 64. In an embodiment, the verification function subsystem 64 automatically determines whether the hydraulic line segments 80, 82 are operational based on the signals from the hydraulic fitting 70.

Figure 5:
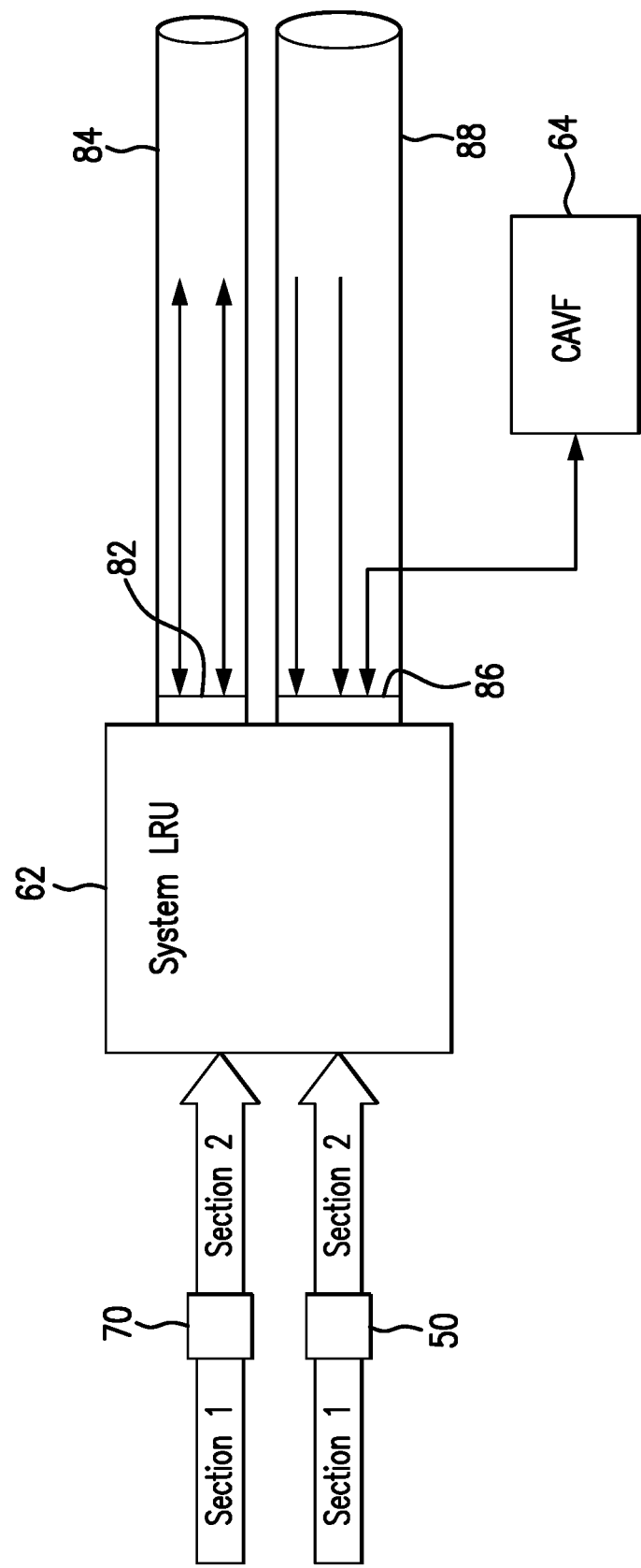
FIG. 5 is a block diagram of an example of a line replaceable unit (LRU) according to an embodiment.

Turning now to FIG. 5, the LRU 62 is shown in greater detail. In the illustrated example, the LRU 62 includes a first electrical connector 82 coupled to a digital wiring bundle 84 (e.g., carrying Ethernet, ARINC/Aeronautical Radio, Inc. and/or CAN/Controller Area Network bus signals) and a second electrical connector 86 coupled to an analog wiring bundle 88. The electrical connectors 82, 86 provide proper grounding and bonding after installation. In an embodiment, the LRU 62, when powered on, senses electrical signals and associated impedances corresponding to the electrical connectors 82, 86, which may be readily substituted for the electrical connectors 24, 34 (FIG. 1), already discussed. When different aircraft sections to be evaluated comprise at least two adjoining sections of a production aircraft being assembled, upon startup, the verification function subsystem may be configured to further detect (via the LRU) electrical signals from avionics or other electrical equipment that have been installed in the at least two adjoining sections, and to determine if the correct electrical signals received via the electrical connectors match signals expected from the avionics equipment. Thus, the LRU 62 provides multiple levels of verification with respect to the electrical connectors 82, 86. First, the LRU 62 determines whether the correct electrical signals are detected at the wiring physical layer. Second, the LRU 62 determines whether the correct information is received at the application layer.

Additionally, the airflow fitting 50 monitors drops in flow pressure and detects upstream leaks or clogs, where the hydraulic fitting 70 prevents leaking after installation and detects dirtiness/contamination. When different aircraft sections to be evaluated comprise at least two adjoining sections of a production aircraft being assembled, upon startup, the verification function subsystem may be configured to further detect (via the conduit sensors) signals from airflow or hydraulic equipment that has been installed in the at least two adjoining sections, and to determine if the signals received via the conduit sensors match flow or pressure values expected from the airflow or hydraulic conduit lines. Thus, the operating conditions reported (e.g., as a self-verification result) from the LRU 62 to the verification function subsystem 64 include failures, overheating, excessive vibration, power conditions, data corruption, security event detection, fluid quantity, and so forth. In an embodiment, the verification function subsystem 64 verifies the operational condition further based on condition of assembly (CoA) data. Indeed, the verification function subsystem 64 may automatically filter out false positive information based on the CoA data (e.g., automatically ignoring failures associated with aircraft sections that have not yet been installed).

Figure 6:
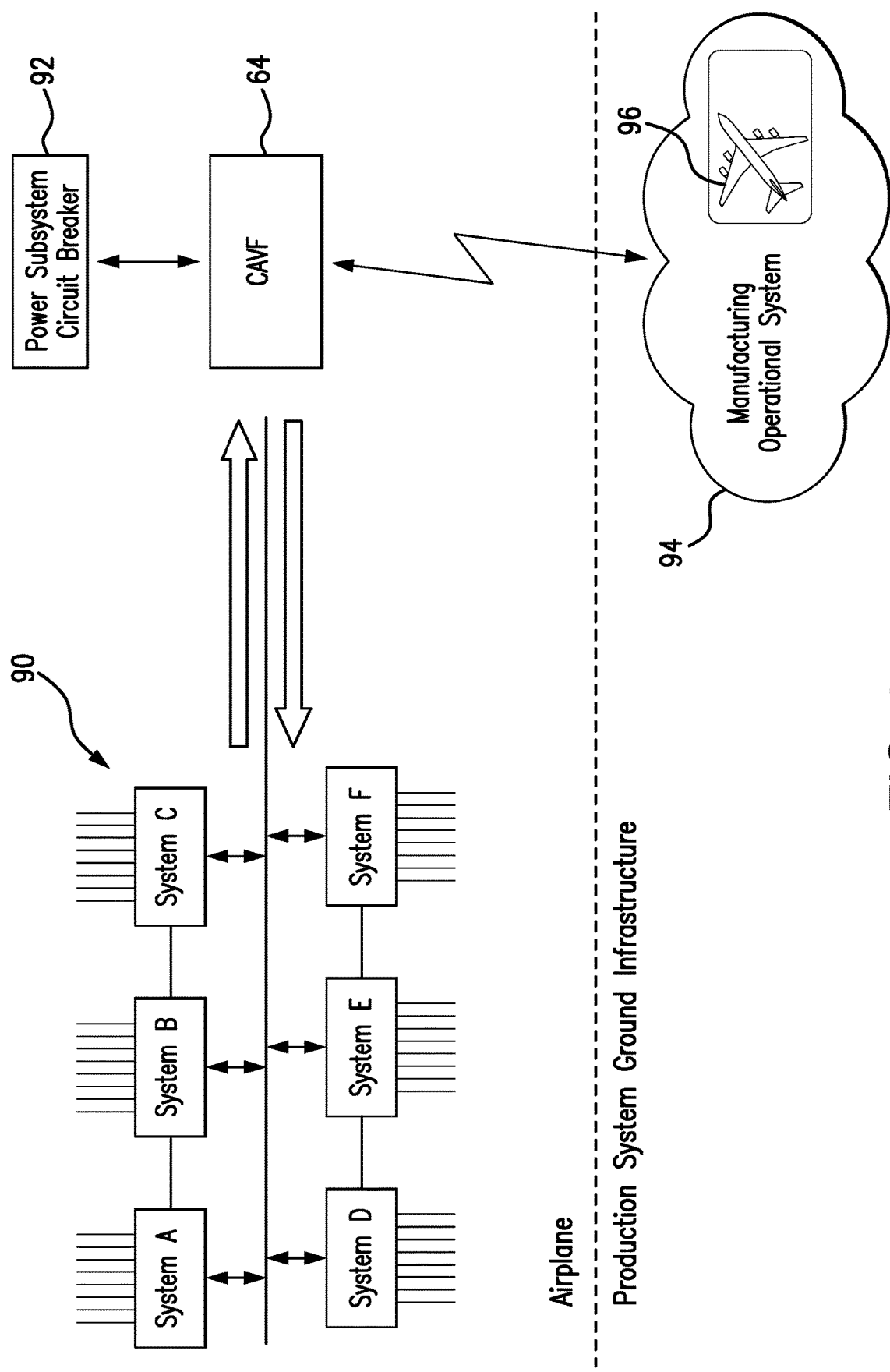
FIG. 6 is a block diagram of an example of an aircraft build architecture according to an embodiment.

FIG. 6 shows an aircraft build architecture in which the verification function subsystem 64 communicates with a plurality of aircraft systems 90 (Systems "A"-"F"), a circuit breaker 92 and a manufacturing operation system 94 (e.g., in a production system ground infrastructure). In one example, the operation system 94 manages installation jobs of building an aircraft. Thus, the operation system 94 may maintain a current CoA and a digital twin 96 of the aircraft, which are used by the verification function subsystem 64 to determine whether a non-operational condition (e.g., fault, failure) exists before or after additional aircraft sections are assembled. The verification function subsystem 64 may also query the circuit breaker 92 for status information (e.g., open, closed, locked), where the circuit breaker 92 selectively maintains power to the aircraft systems 90 and the verification function subsystem 64 controls the circuit breaker 92 based on the results of the query. As will be discussed in greater detail, the verification function subsystem 64 may conduct a correlation between information obtained from the systems 90, the manufacturing operation system 94, and the circuit breaker 92 and determine whether to assign a "Pass" or "Fail" designation to the systems 90 as well as the interfaces (e.g., buses) between the systems 90.

Correlation Examples

For example, System A may have a "design-in-build" capability that detects a lack of activity on the interfaces to Systems B, C, and D. In such a case, System A may report three faults (e.g., interface B fault, interface C fault, interface D fault) to the verification function subsystem 64. Upon being powered on, the verification function subsystem 64 can obtain current CoA build progress information from the manufacturing operation system 94. The build progress information might indicate that System A is installed (e.g., including a hardware part number, software part number, etc.), System B is installed (e.g., including a hardware part number, software part number, etc.), System C is not installed, System D is installed (e.g., including a hardware part number, software part number, etc.), and so forth.

The verification function subsystem 64 may also obtain status information from the manufacturing operation system 94 for the circuit breaker 92. In an embodiment, the status information is defined by the production organization to ensure safety to individuals involved in the build process. For example, the status information might indicate that the circuit for System A is not locked, the circuit for System B is not locked, the circuit for System C is locked, the circuit for System D is not locked, and so forth. In one example, "locked" indicates that the circuit is opened (e.g., no power) and can only be unlocked by a human with a special tool to cut a lock tag.

For the systems listed as installed in the CoA build progress information, the verification function subsystem 64 queries the circuit breaker 92 to confirm the status. For example, the circuit breaker 92 may indicate that the circuit for System A is closed (e.g., power on), the circuit for System B is closed (e.g., power on), the circuit for System C is locked and opened (e.g., power off), and the circuit for System D is opened (e.g., power off, for other installation purpose).

Accordingly, the verification function subsystem 64 can conduct a correlation between the information obtained from the systems 90, the manufacturing operation system 94, and the circuit breaker 92 and determine whether to assign a "Pass" or "Fail" designation to the systems 90 as well as the interfaces between the systems 90. In this example, System A is given the Pass designation because it is installed, powered on and reported design build verification data to the verification function subsystem 64. With respect to System B, the verification function subsystem 64 can determine whether design build verification data has been received. If so, the verification function subsystem 64 may also assign the Pass designation to System B (e.g., installed, powered on and reporting build verification data), but assign the Fail designation (e.g., with wiring as a possible cause) to the interface between System A and System B.

If, on the other hand, System B has not reported design build verification data to the verification function subsystem 64, the verification function subsystem 64 may assign the Fail designation to System B and ignore the interface B fault reported from System A. In such a case, the verification function subsystem 64 may query System B to determine the root cause. In an embodiment, the verification function subsystem 64 toggles power to System B via the circuit breaker 92 to confirm whether System B is actually malfunctioning.

Additionally, the verification function subsystem 64 may ignore the interface C fault reported from System A as a false positive because System C is not installed. Moreover, the verification function subsystem 64 may ignore the interface D fault reported from System A as a false positive because System D is powered off.

In the case of a System B failure, a repair process may be initiated in response to notification of the failure from the verification function subsystem 64. In such a case, a mechanic may open the circuit to System B as part of a safety measure. In an embodiment, the verification function subsystem 64 detects the open circuit to System B via a query to the circuit breaker 92 and reports to the manufacturing operation system 94 that System B is offline. Once the repair or replacement of System B is complete, the verification function subsystem may automatically repeat the correlation procedure. This enables verification of components and/or correction of non-operational components on assembled adjoining sections of an aircraft, prior to continued assembly of subsequent sections thereafter.

Figure 7:
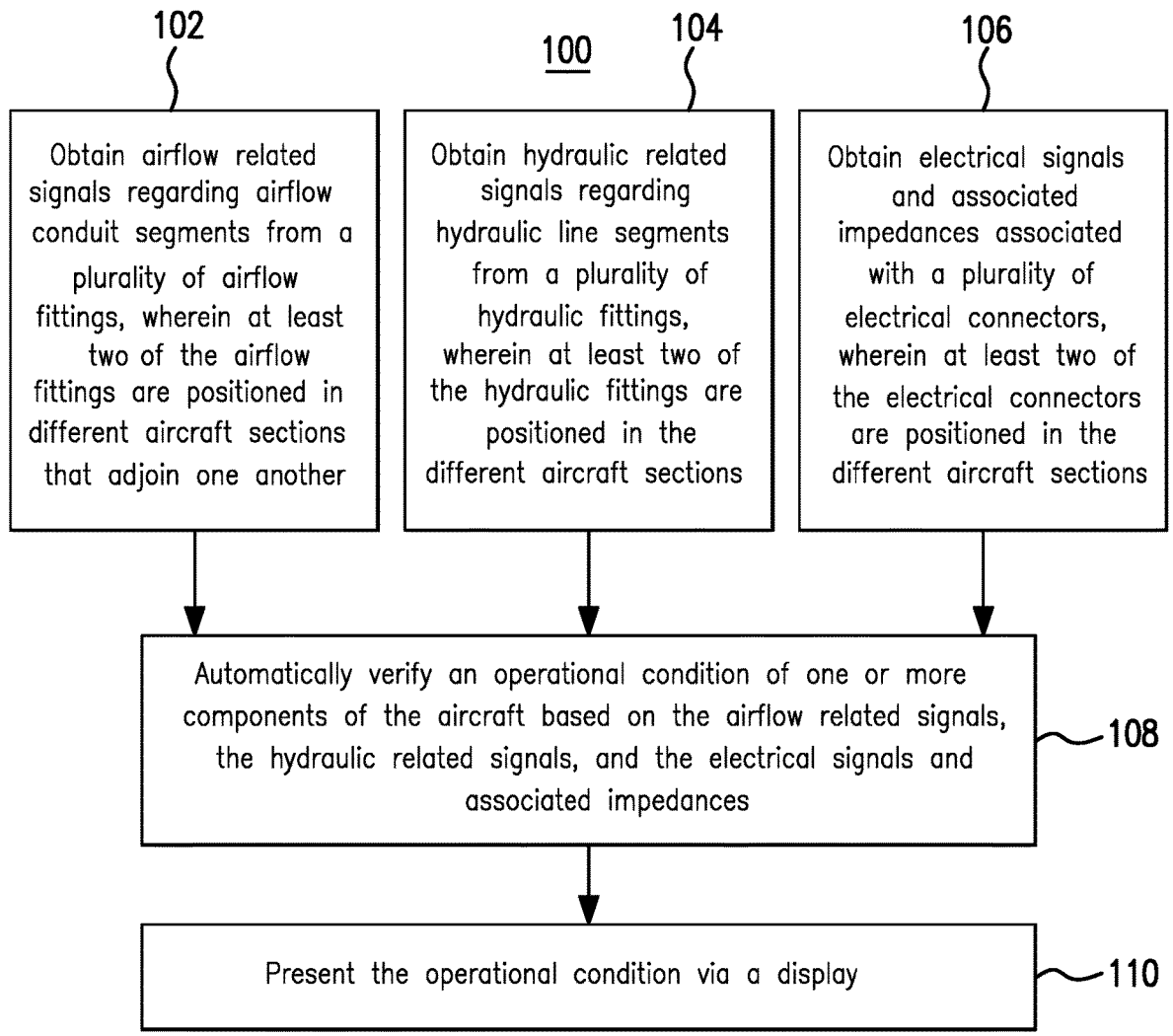
FIG. 7 is a flowchart of an example of a method of operating a verification system while an aircraft is being assembled according to an embodiment.

FIG. 7 shows a method 100 of operating a verification system while an aircraft is being assembled. The method 100 may generally be implemented in a verification function subsystem such as, for example, the verification function subsystem of the avionics systems 30 (FIG. 1) and/or the verification function subsystem 64 (FIG. 5), already discussed. More particularly, the method 100 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 102 obtains a plurality of airflow related signals regarding airflow conduit segments from a plurality of airflow fittings, wherein at least two of the airflow fittings are positioned in different aircraft sections that adjoin one another. Additionally, block 104 may obtain hydraulic related signals regarding hydraulic line segments from a plurality of hydraulic fittings, wherein at least two of the hydraulic fittings are positioned in the different aircraft sections. In an embodiment, block 106 obtains electrical signals and associated impedances associated with a plurality of electrical connectors, wherein at least two of the electrical connectors are positioned in the different aircraft sections. Blocks 102, 104 and 106 may obtain the signals via push communications, pull communications or any combination thereof.

Block 108 automatically verifies an operational condition (e.g., Pass or Fail) of one or more components of the aircraft based on the airflow related signals, the hydraulic related signals, and the electrical signals and associated impedances. In one example, block 108 verifies the operational condition further based on CoA data. In such a case, block 108 may also filter out and/or ignore false positive information based on the CoA data. In an embodiment, block 110 presents the operational condition via a display such as, for example, a flight deck display in the aircraft and/or a remote display (e.g., in a manufacturing operation system).

In an embodiment, the verification function subsystem upon startup is configured to further detect a non-operational condition of an identified component and generate an output to the flight deck display and/or other display device of information indicating the non-operational condition of the identified component in a particular section. Additionally, when the different aircraft sections comprise at least two adjoining sections of a production aircraft being assembled, upon startup, the verification function subsystem may be configured to further detect a non-operational condition of a component. For example, when different aircraft sections to be evaluated comprise at least two adjoining sections of a production aircraft being assembled, upon startup, the verification function subsystem may be configured to further detect (via the LRU) electrical signals from avionics or other electrical equipment that have been installed in the at least two adjoining sections, and to determine if the correct electrical signals received via the electrical connectors match signals expected from the avionics equipment, and to detect a non-operating condition where the sensed signal from a particular aircraft section and/or electrical connector does not match the expected signal. In such a case, the verification function subsystem generates an output to a display of information indicating the non-operational condition of the component in a particular section, before additional aircraft sections are assembled. The illustrated method 100 therefore enhances performance at least to the extent that verifying the operational condition while the aircraft is being assembled increases reliability and enables errors and/or faults to be detected earlier in the build process. Indeed, the method 100 significantly reduces time and cost.

Figure 8:
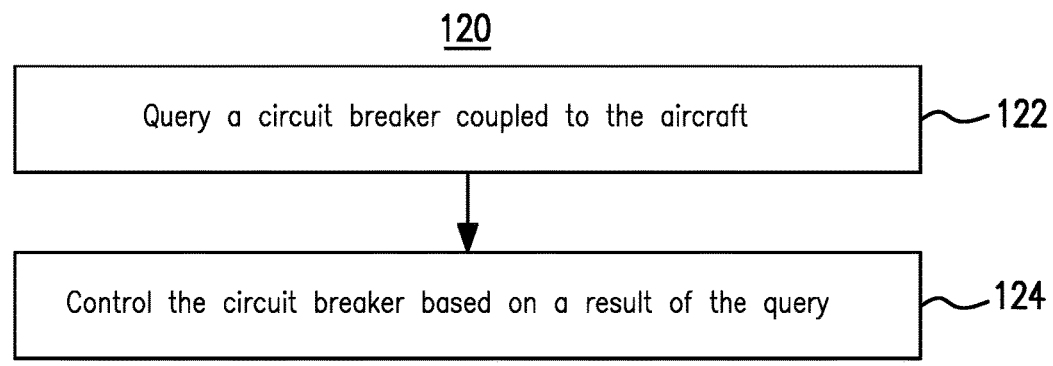
FIG. 8 is a flowchart of an example of a method of communicating with a circuit breaker according to an embodiment.

FIG. 8 shows a method 120 of communicating with a circuit breaker. The method 120 may generally be implemented in a verification function subsystem such as, for example, the verification function subsystem of the avionics systems 30 (FIG. 1) and/or the verification function subsystem 64 (FIG. 5), already discussed. More particularly, the method 120 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 122 provides for querying a circuit breaker coupled to the aircraft. In an embodiment, block 124 controls the circuit breaker based on a result of the querying. For example, block 124 might include toggling power to a component or system that is suspected of being faulty. The method 120 therefore further enhances performance by enabling automated troubleshooting.

Figure 9:
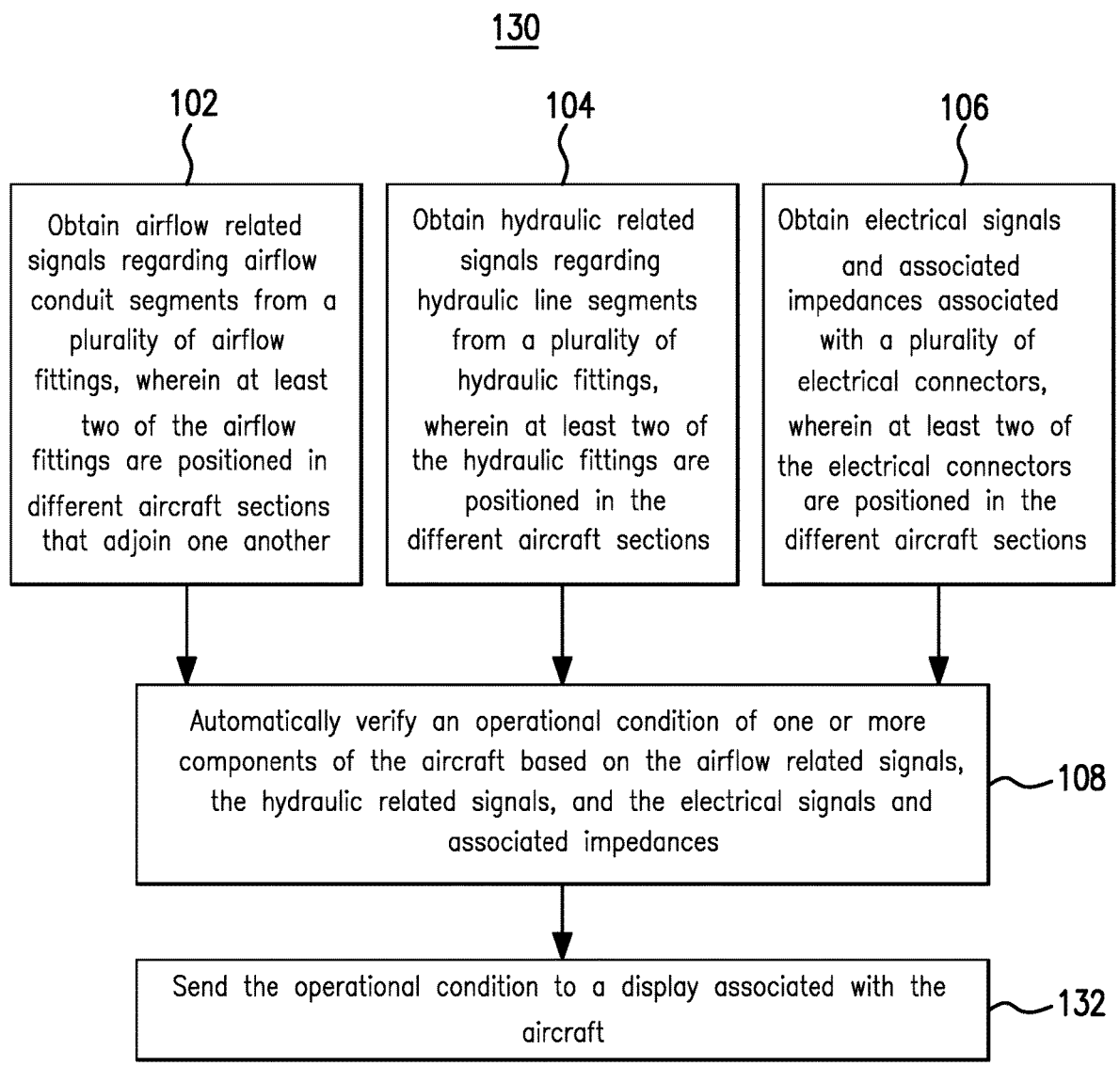
FIG. 9 is a flowchart of an example of a method of operating a verification system after an aircraft has been assembled according to an embodiment.

FIG. 9 shows a method 130 of operating a verification system after an aircraft has been assembled. The method 130 may generally be implemented in a verification function subsystem such as, for example, the verification function subsystem of the avionics systems 30 (FIG. 1) and/or the verification function subsystem 64 (FIG. 5), already discussed. More particularly, the method 130 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

The processing blocks are similar to the processing blocks of the method 100 (FIG. 7), except that illustrated block 132 expressly sends the operational condition to a display associated with the aircraft. Thus, the method 130 might be conducted while the aircraft is in the flight line, delivery center and/or in service.

Figure 10:
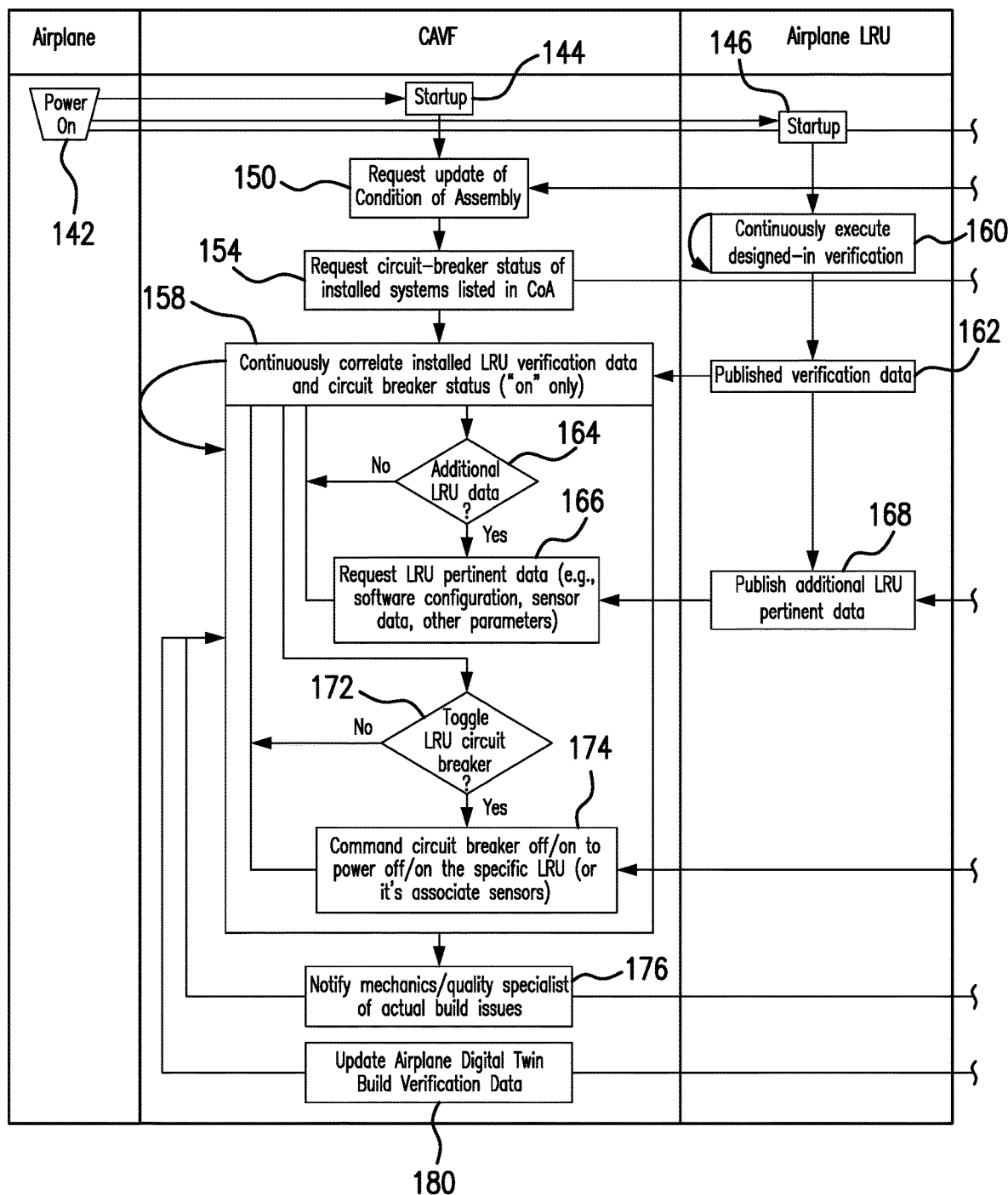
FIG. 10 is a flowchart of an example of a method of operating an aircraft build architecture according to an embodiment.
Figure 10:
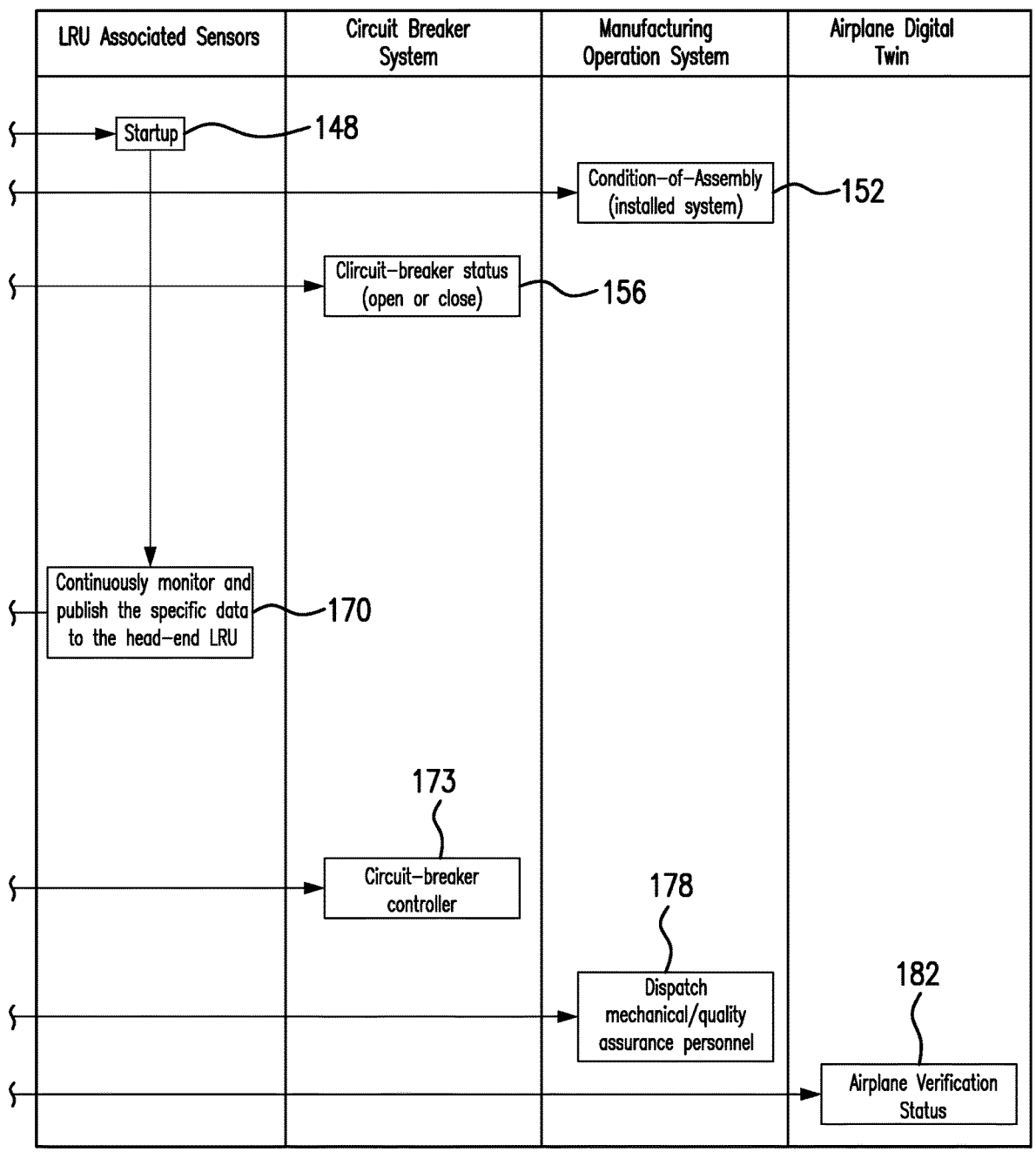

FIG. 10 shows a method 140 of operating an aircraft build architecture. The method 140 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated airplane block 142 conducts a power on, which initiates a startup at CAVF block 144, LRU block 146, and sensor block 148. CAVF block 150 may request an update of the condition of assembly (CoA). In an embodiment, operation system block 152 provides the CoA (e.g., listing installed systems) in response to the request from block 150. In one example, CAVF block 154 requests the circuit breaker status of installed systems listed in the CoA, where circuit breaker block 156 provides the circuit breaker status (e.g., open or closed) in response to the request from CAVF block 154. LRU block 160 continuously executes designed-in verification processes. Illustrated LRU block 162 sends published verification data to CAVF block 158, which may continuously correlate installed LRU verification data and circuit breaker status information (e.g., limited to "on" systems).

More particularly, illustrated CAVF block 164 determines whether additional LRU data is available. If so, CAVF block 166 requests LRU pertinent data such as, for example, software configuration information, sensor data and/or other parameters. In an embodiment, sensor block 170 continuously monitors and publishes data to the LRU, where LRU block 168 sends the additional LRU pertinent data to CAVF block 158. If it is determined at CAVF block 164 that there is no additional LRU data, the method 140 bypasses CAVF block 166.

In an embodiment, CAVF block 172 determines whether a toggle of the LRU circuit breaker is appropriate. If so, illustrated CAVF block 174 commands the circuit breaker to conduct an off/on transition (e.g., resulting in an off/on state transition) for the specific LRU or associated sensors. In such a case circuit breaker block 173 operates an internal controller accordingly. If it is determined at CAVF block 172 that a toggle of the LRU circuit breaker is not appropriate, the method 140 may bypass CAVF block 174.

In one example, CAVF block 176 notifies a mechanic and/or quality specialist of actual build issues, where operation system block 178 dispatches the mechanic and/or quality specialist personnel. In an embodiment, CAVF block 180 updates airplane digital twin build verification data. Additionally, digital twin block 182 may modify the airplane verification status as appropriate.

Figure 11:
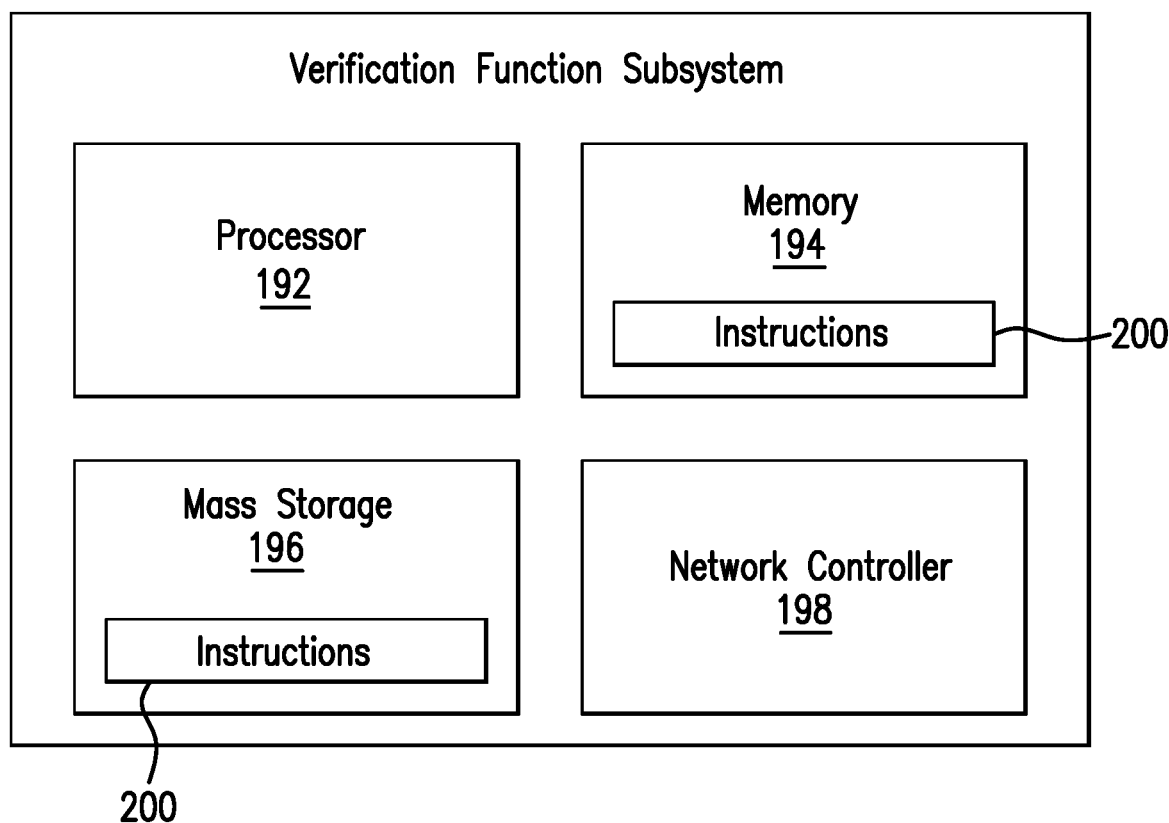
FIG. 11 is a block diagram of an example of a verification function subsystem according to an embodiment.

FIG. 11 shows a verification function subsystem 190 that may be readily substituted for the verification function subsystem of the avionics systems 30 (FIG. 1) and/or the verification function subsystem 64 (FIG. 5), already discussed. In an embodiment, the verification function subsystem 190 includes a processor 192 (e.g., microcontroller), a memory 194 (e.g., volatile memory such as RAM), mass storage 196 (e.g., non-volatile memory such as ROM and/or flash memory), and a network controller 198 (e.g., supporting wired and/or wireless communications).

The memory 194 and/or the mass storage 196 may include stored instructions 200, which when executed by the processor 192, cause the processor 192 to implement one or more aspects of the method 100 (FIG. 7), the method 120 (FIG. 8), the method 130 (FIG. 9) and/or the method 140 (FIG. 10). Thus, execution of the instructions 200 may cause the subsystem 190 and/or the processor 192 to obtain airflow related signals regarding airflow conduit segments from a plurality of airflow fittings, wherein at least two of the airflow fittings are positioned in different aircraft sections that adjoin one another. Execution of the instructions 200 may also cause the processor 192 to obtain hydraulic related signals regarding hydraulic line segments from a plurality of hydraulic fittings, wherein at least two of the hydraulic fittings are positioned in the different aircraft sections. In an embodiment, execution of the instructions 200 further causes the processor 192 to obtain electrical signals and associated impedances associated with a plurality of electrical connectors, wherein at least two of the electrical connectors are positioned in the different aircraft sections.

In one example, execution of the instructions 200 also causes the processor 192 to automatically verify an operational condition of one or more components of the aircraft based on the airflow related signals, the hydraulic related signals, and the electrical signals and associated impedances. Moreover, execution of the instructions 200 may cause the processor 192 to present the operational condition via a display. The verification function subsystem 190 is therefore performance-enhanced at least to the extent that verifying the operational condition while the aircraft is being assembled increases reliability and enables errors and/or faults to be detected earlier in the build process. Indeed, the verification function subsystem 190 may significantly reduce time and cost.

ADDITIONAL NOTES AND EXAMPLES

Example one includes a verification system for an aircraft, comprising a plurality of airflow fittings, wherein at least two of the airflow fittings are positioned in different aircraft sections that adjoin one another, and wherein each airflow fitting connects airflow conduit segments and includes one or more conduit sensors to generate airflow related signals regarding the airflow conduit segments, a plurality of hydraulic fittings, wherein at least two of the hydraulic fittings are positioned in the different aircraft sections, and wherein each hydraulic fitting connects hydraulic line segments and includes one or more line sensors to generate hydraulic related signals regarding the hydraulic line segments, a plurality of electrical connectors, wherein at least two of the electrical connectors are positioned in and connect wiring in the different aircraft sections, a line replaceable unit to sense electrical signals and associated impedances corresponding to the plurality of electrical connectors, and a verification function subsystem to automatically verify an operational condition of one or more components of an aircraft based on the airflow related signals, the hydraulic related signals, and the electrical signals and associated impedances, and present the operational condition via a display.

Example two includes the verification system of Example one, wherein the verification function subsystem is to verify the operational condition further based on condition of assembly data.

Example three includes the verification system of Example two, wherein the verification function subsystem is to filter out false positive information based on the condition of assembly data.

Example four includes the verification system of Example one, wherein the verification function subsystem is to verify the operational condition while the aircraft is being assembled.

Example five includes the verification system of Example one, wherein the verification function subsystem is to verify the operational condition after the aircraft has been assembled.

Example six includes the verification system of Example one, wherein the verification function subsystem is to query a circuit breaker coupled to the aircraft and control the circuit breaker based on a result of the query.

Example seven includes the verification system of Example one, wherein the one or more conduit sensors include a pressure sensor, an air quality sensor and a temperature sensor.

Example eight includes the verification system of Example one, wherein the one or more line sensors include a pressure sensor, a fluid level sensor, a contamination control sensor, and a temperature sensor.

Example nine includes the verification system of Example one, wherein the operational condition is to be presented via a flight deck display in the aircraft.

Example ten includes the verification system of Example nine, wherein the verification function subsystem upon startup is configured to further detect a non-operational condition of an identified component and generate an output to the flight deck display of information indicating the non-operational condition of the identified component in a particular section.

Example eleven includes the verification system of Example ten, wherein the operational condition is to be presented via a remote display.

Example twelve includes the verification system of Example ten, wherein the different aircraft sections comprise at least two adjoining sections of a production aircraft being assembled, and where upon start up, the verification function subsystem is configured to further detect a non-operational condition of a component and generate an output to a display of information indicating the non-operational condition of the component in a particular section, before additional aircraft sections are assembled.

Example thirteen includes a method of operating a verification system after an aircraft has been assembled, the method comprising obtaining airflow related signals regarding airflow conduit segments from a plurality of airflow fittings, wherein at least two of the airflow fittings are positioned in different aircraft sections that adjoin one another, obtaining hydraulic related signals regarding hydraulic line segments from a plurality of hydraulic fittings, wherein at least two of the hydraulic fittings are positioned in the different aircraft sections, obtaining electrical signals and associated impedances associated with a plurality of electrical connectors, wherein at least two of the electrical connectors are positioned in the different aircraft sections, automatically verifying an operational condition of one or more components of the aircraft based on the airflow related signals, the hydraulic related signals, and the electrical signals and associated impedances, and sending the operational condition to a display associated with the aircraft.

Example fourteen includes the method of Example thirteen, wherein the operational condition is verified further based on condition of assembly data.

Example fifteen includes the method of Example fourteen, further including filtering out false positive information based on the condition of assembly data.

Example sixteen includes the method of Example thirteen, further including querying a circuit breaker coupled to the aircraft, and controlling the circuit breaker based on a result of the querying.

Example seventeen includes the method of Example thirteen, further including presenting the operational condition via one or more of a flight deck display in the aircraft or a remote display.

Example eighteen includes a method of operating a verification system while an aircraft is being assembled, the method comprising obtaining airflow related signals regarding airflow conduit segments from a plurality of airflow fittings, wherein at least two of the airflow fittings are positioned in different aircraft sections that adjoin one another, obtaining hydraulic related signals regarding hydraulic line segments from a plurality of hydraulic fittings, wherein at least two of the hydraulic fittings are positioned in the different aircraft sections, obtaining electrical signals and associated impedances associated with a plurality of electrical connectors, wherein at least two of the electrical connectors are positioned in the different aircraft sections, automatically verifying an operational condition of one or more components of the aircraft based on the airflow related signals, the hydraulic related signals, and the electrical signals and associated impedances, and presenting the operational condition via a display.

Example nineteen includes the method of Example eighteen, wherein the operational condition is verified further based on condition of assembly data.

Example twenty includes the method of Example nineteen, further including filtering out false positive information based on the condition of assembly data.

Example twenty-one includes the method of Example eighteen, further including querying a circuit breaker coupled to the aircraft, and controlling the circuit breaker based on a result of the querying.

Example twenty-two includes the method of Example eighteen, wherein the operational condition is presented via one or more of a flight deck display in the aircraft or a remote display.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD (solid state drive)/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A verification system for an aircraft, comprising:
a plurality of airflow fittings, wherein at least two of the airflow fittings are positioned in different aircraft sections that adjoin one another, and wherein each airflow fitting connects airflow conduit segments and includes one or more conduit sensors to generate airflow related signals regarding the airflow conduit segments;
a plurality of hydraulic fittings, wherein at least two of the hydraulic fittings are positioned in the different aircraft sections, and wherein each hydraulic fitting connects hydraulic line segments and includes one or more line sensors to generate hydraulic related signals regarding the hydraulic line segments;

a plurality of electrical connectors, wherein at least two of the electrical connectors are positioned in and connect wiring in the different aircraft sections;

a line replaceable unit to sense electrical signals and associated impedances corresponding to the plurality of electrical connectors; and a verification function subsystem to automatically verify an operational condition of one or more components of an aircraft based on the airflow related signals, the hydraulic related signals, and the electrical signals and associated impedances, and present the operational condition via a display.

2. The verification system of claim 1, wherein the verification function subsystem is to verify the operational condition further based on condition of assembly data.

3. The verification system of claim 2, wherein the verification function subsystem is to filter out false positive information based on the condition of assembly data.

4. The verification system of claim 1, wherein the verification function subsystem is to verify the operational condition while the aircraft is being assembled.

5. The verification system of claim 1, wherein the verification function subsystem is to verify the operational condition after the aircraft has been assembled.

6. The verification system of claim 1, wherein the verification function subsystem is to query a circuit breaker coupled to the aircraft and control the circuit breaker based on a result of the query.

7. The verification system of claim 1, wherein the one or more conduit sensors include a pressure sensor, an air quality sensor and a temperature sensor.

8. The verification system of claim 1, wherein the one or more line sensors include a pressure sensor, a fluid level sensor, a contamination control sensor, and a temperature sensor.

9. The verification system of claim 1, wherein the operational condition is to be presented via a flight deck display in the aircraft.

10. The verification system of claim 9, wherein the verification function subsystem upon startup is configured to further detect a non-operational condition of an identified component and generate an output to the flight deck display of information indicating the non-operational condition of the identified component in a particular section.

11. The verification system of claim 1, wherein the operational condition is to be presented via a remote display.

12. The verification system of claim 1, wherein the different aircraft sections comprise at least two adjoining sections of a production aircraft being assembled, and where upon start up, the verification function subsystem is configured to further detect a non-operational condition of a component and generate an output to a display of information indicating the non-operational condition of the component in a particular section, before additional aircraft sections are assembled.

13. A method of operating a verification system after an aircraft has been assembled, the method comprising:

obtaining airflow related signals regarding airflow conduit segments from a plurality of airflow fittings, wherein at least two of the airflow fittings are positioned in different aircraft sections that adjoin one another;

obtaining hydraulic related signals regarding hydraulic line segments from a plurality of hydraulic fittings, wherein at least two of the hydraulic fittings are positioned in the different aircraft sections;

obtaining electrical signals and associated impedances associated with a plurality of electrical connectors, wherein at least two of the electrical connectors are positioned in the different aircraft sections;

automatically verifying an operational condition of one or more components of the aircraft based on the airflow related signals, the hydraulic related signals, and the electrical signals and associated impedances; and sending the operational condition to a display associated with the aircraft.

14. The method of claim 13, wherein the operational condition is verified further based on condition of assembly data.

15. The method of claim 14, further including filtering out false positive information based on the condition of assembly data.

16. The method of claim 13, further including:
querying a circuit breaker coupled to the aircraft; and
controlling the circuit breaker based on a result of the querying.

17. The method of claim 13, further including presenting the operational condition via one or more of a flight deck display in the aircraft or a remote display.

18. A method of operating a verification system while an aircraft is being assembled, the method comprising:

obtaining airflow related signals regarding airflow conduit segments from a plurality of airflow fittings, wherein at least two of the airflow fittings are positioned in different aircraft sections that adjoin one another;

obtaining hydraulic related signals regarding hydraulic line segments from a plurality of hydraulic fittings, wherein at least two of the hydraulic fittings are positioned in the different aircraft sections;

obtaining electrical signals and associated impedances associated with a plurality of electrical connectors, wherein at least two of the electrical connectors are positioned in the different aircraft sections;

automatically verifying an operational condition of one or more components of the aircraft based on the airflow related signals, the hydraulic related signals, and the electrical signals and associated impedances; and presenting the operational condition via a display.

19. The method of claim 18, wherein the operational condition is verified further based on condition of assembly data.

20. The method of claim 19, further including filtering out false positive information based on the condition of assembly data.

21. The method of claim 18, further including:
querying a circuit breaker coupled to the aircraft; and
controlling the circuit breaker based on a result of the querying.

22. The method of claim 18, wherein the operational condition is presented via one or more of a flight deck display in the aircraft or a remote display.

* * * * *